United States Patent [19]
Rohs et al.

[11] Patent Number: 5,078,246
[45] Date of Patent: Jan. 7, 1992

[54] DEVICE FOR CHANGING THE FLOW RATE IN A TORSIONAL OSCILLATION DAMPER

[75] Inventors: Ulrich Rohs, Dueren; Hans Rohs, Rechberghausen; Dietmar Heidingsfeld, Aachen; Hans Petri, Much, all of Fed. Rep. of Germany

[73] Assignee: Dr.-Ing. Ulrich Rohs, Dueren, Fed. Rep. of Germany

[21] Appl. No.: 532,443

[22] Filed: Jun. 4, 1990

[30] Foreign Application Priority Data

Jun. 2, 1989 [DE] Fed. Rep. of Germany ....... 3918063

[51] Int. Cl.$^5$ ............................................. F16D 31/04
[52] U.S. Cl. ........................................ 192/61; 475/94; 418/165
[58] Field of Search ................. 192/61, 30 V; 475/91, 475/92, 93, 94, 95; 418/165, 200

[56] References Cited

U.S. PATENT DOCUMENTS

| 3,180,182 | 4/1965 | Tiberio | 475/95 |
| 3,802,813 | 4/1974 | Butler | 416/165 |
| 4,610,184 | 9/1986 | Taylor | 192/61 |

FOREIGN PATENT DOCUMENTS

| 1822807 | 9/1968 | Fed. Rep. of Germany. | |
| 62-52245 | 3/1987 | Japan | 192/61 |

Primary Examiner—Allan D. Herrmann
Assistant Examiner—Andrea Pitts
Attorney, Agent, or Firm—Collard, Roe & Galgano

[57] ABSTRACT

A device for changing the flow rate of a liquid damping medium is a torsional vibration damper. This damper has a rotating cylindrical damper housing, connected between a drive shaft and a power takeoff shaft. Pinions are surface-mounted in a planetary fashion without axle journals between the axial faceplates of a gear pump in recesses in the pump interior. The pinions are engaged with a central gear seated on the power takeoff shaft or on drive shaft, which form gear pumps for closed circulation of the damping medium.

13 Claims, 4 Drawing Sheets

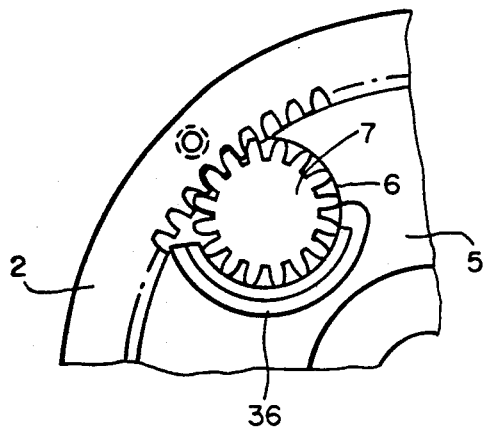
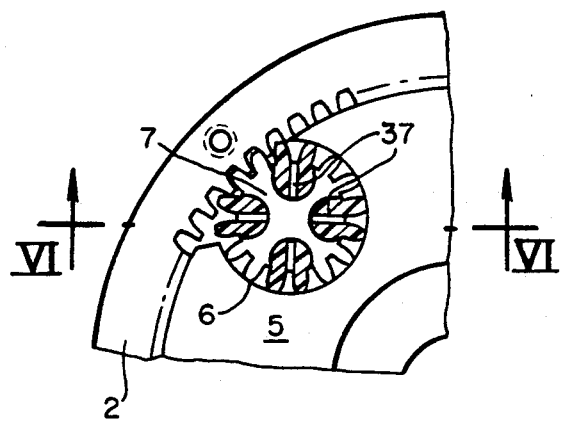
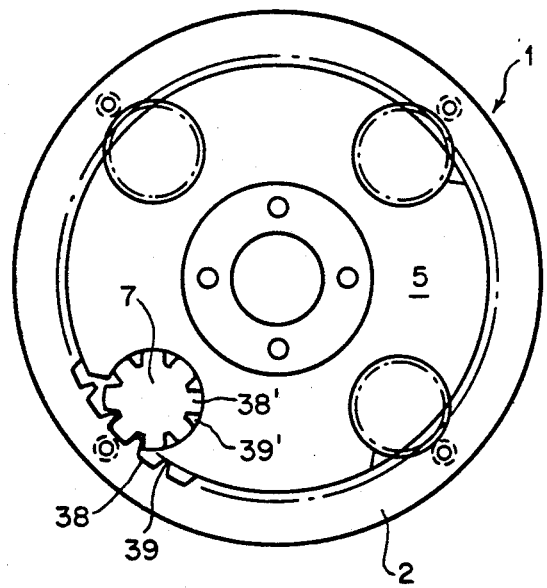
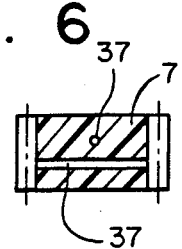
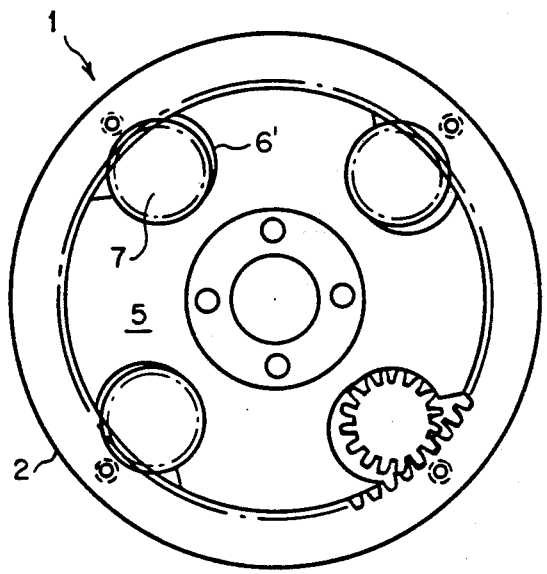

DEVICE FOR CHANGING THE FLOW RATE IN A TORSIONAL OSCILLATION DAMPER

BACKGROUND OF THE INVENTION

1. Field of the Invention

This invention relates to a device for changing the time flow rate of a liquid damping medium in a torsional oscillation or vibration damper, especially for piston engines, in whose rotating cylindrical damper housing, connected to the drive shaft and power takeoff shaft, pinions are mounted in planetary fashion and are engaged with a central gear seated on the power takeoff shaft or drive shaft, and form a gear pump for closed circulation of the damping medium, with a storage chamber with flexibly changeable volume, for example, a diaphragm reservoir or the like and/or a speed-controlled plunger valve being provided, whose piston is suitable for changing the cross section of the feed pipe as a throttle regulator by its axial motion.

2. Brief Description of the Prior Art

A device of this type is disclosed by DE-C-37 26 926, which corresponds to U.S. Pat. No. 4,905,807. Difficulties with internal leaks, especially with the gear pump, can also occur with this device, since it is possible because of internal leaks that may arise due to unwanted relative torsion forces. To avoid this, as with all other known torsional vibration oscillation dampers, relatively high-viscosity oils have to be used here as the damping medium. However, viscous oils have relatively poor lubricating properties, and are therefore rather undesirable in and of themselves.

SUMMARY OF THE INVENTION

Therefore, it is an object of the present to provide a torsional oscillation damper that permits better sealing and which can also be produced more simply and more inexpensively.

According to the present invention, omitting the axle journals of the pinions and their bearings results not only in construction and assembly benefits, but also in a better seal of the gear pump. Production dimensions with less exacting tolerances are another benefit.

According to the invention, having the design of the central gear as a ring gear with internal teeth is particularly beneficial. Thus the same delivery volume from the gear pump, a gear pump with a ring gear can be built smaller in size and more compact. It is thus possible, even with a relatively small amount of structural space, to accommodate a reliable, strong device.

Since the inlet for the damping medium is on the outside, a good bubble-free feed of the damping medium into the suction side will always result from the action of centrifugal force. The air accumulates inside. The ring gear design, because of its relatively large radial area and lever lengths for the pump interior, provides a good possibility for absorbing axial and tilting forces, as well as providing large spaces to hold damping medium. The larger specific delivery volume of the gear pump with ring gear also leads to lower operating pressures, and thereby also contributes to avoiding any leaks. It is especially favorable that the relatively large internal space can be utilized to accommodate more than two pinions arranged in planetary fashion.

The above objects and advantages are accomplished in accordance with the present invention by providing a device for changing the flow rate of a liquid damping medium connected between the drive shaft and the power takeoff shaft of an engine comprising a torsional vibration damper having a rotating cylindrical damper housing, connected to said drive shaft and said power takeoff shaft; pinions planetary mounted and engaged with a central gear seated on said power takeoff shaft or said drive shaft; a gear pump for closed circulation of the damping medium, having a storage chamber with flexibly changeable volume; a speed-controlled plunger valve being provided in said feed pipe for the damping medium, having a piston for changing the cross section of the feed pipe as a throttle regulator by its axial motion; said pinions of the gear pump arranged in planetary fashion, and are devoid of axle journals; said gear pump having axial faceplates and recesses in the pump interior; and said pinions being surface mounted between said axial faceplates of the gear pump in said recesses in the pump interior.

BRIEF DESCRIPTION OF THE DRAWINGS

Other objects and features of the present invention will become apparent from the following detailed description considered in connection with the accompanying drawing which discloses several embodiments of the present invention. It should be understood, however, that the drawing is designed for the purpose of illustration only and not as a definition of the limits of the invention.

In the drawing wherein similar reference characters denote similar elements throughout the several views:

FIG. 4 shows a partial top view of a pressure relief means;

FIG. 5 shows a partial top view of another pressure relief means;

FIG. 6 shows a cross section view along line VI—VI of FIG. 5;

FIG. 7 shows a top view of a gear pump having special teeth;

FIG. 8 shows a top view of a gear pump having a special bearing;

DETAILED DESCRIPTION OF PREFERRED EMBODIMENTS

Figure 2:
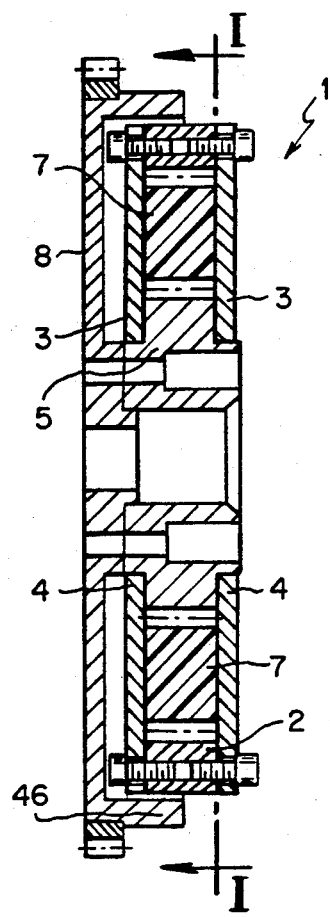
FIG. 2 shows a section view along the line II—II of FIG. 1.
Figure 1:
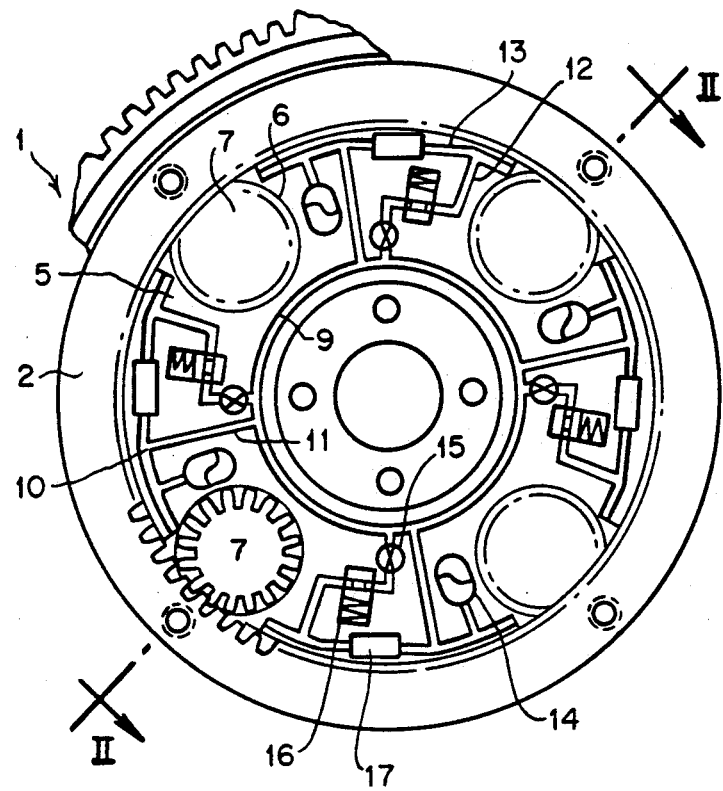
FIG. 1 shows a cross section view through a device according to the present invention along the line I—I of FIG. 2.

Turning now in detail to the drawings, FIGS. 1 and 2 show a device according to the invention with a central gear of a gear pump 1 arranged as a ring gear 2 with internal teeth. The annular face plates 3 are fastened to the gear pump and are mounted to rotate on shoulders 4 of an internal pump part 5. The internal pump part 5 at its edge has four approximately circular, open recesses 6 to hold pinions 7 arranged in planetary fashion. Part 5 is connected by screws, not shown, to the flywheel of the starter gear 8, which overlaps the ring gear 2 with an edge 46 with radial separation like a cup.

The pinions 7 are mounted in the recesses 6 without any axle journals or the like, and are engaged with the ring gear 2. As FIG. 1 shows, the pinions 7 arranged in planetary fashion are connected through a closed feed pipe 10, which in turn comprises an inner ring pipe 9, infeed line 11 and discharge line 12 connected to it, and a control line 13 bridging over them.

Connected to the infeed line 11 is a storage chamber 14 with a flexibly changeable volume, for example a bubble or diaphram reservoir. This reservoir temporarily holds a portion of the damping medium from the infeed line 11, and releases it again after the pressure peak. The storage chamber acts similarly to an air vessel, and in the damping system, it acts like a spring reducing the amplitudes of vibration or oscillation.

From the internal ring line 9, the discharge line 12 runs through a throttle 15 and through a speed-controllable plunger valve 16 that is equipped with a radially positioned, spring-supported piston with a constriction. This piston moves upwardly when centrifugal forces occur and seals the discharge line 12 partly or completely.

The part of the discharge line 12 beyond the plunger valve 16, with the part of the infeed line 11 between the throttle 15 and the storage chamber 14, is bridged over by a control line 13 that passes through a control valve 17.

Figure 3:
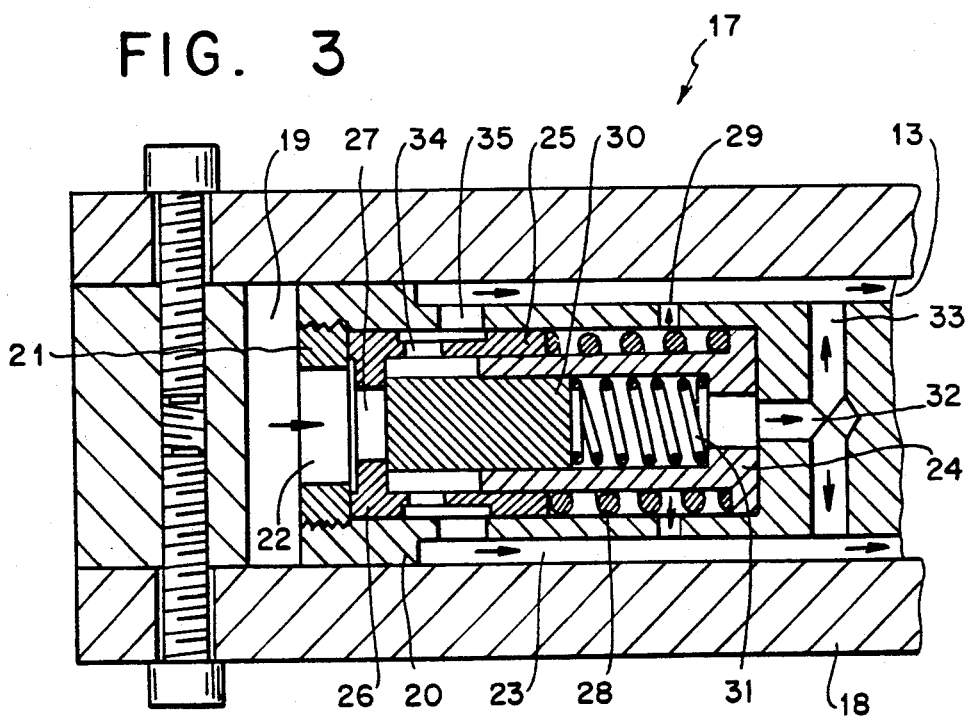
FIG. 3 shows a longitudinal section view through a control valve.

In a preferred embodiment shown in FIG. 3, this control valve 17 is shown enlarged and in longitudinal section. There is a pressure chamber 19 in a housing 18, which is connected to the part of the control line 13 coming from the gear pump 1. The pressure chamber 19 is bounded by a cylinder 20 whose bottom 21 is provided with a bore 22 which bounds the pressure chamber 19. The cylinder 20 has a smaller outside diameter above its bottom, so that it forms a ring channel 23 with the housing 18. Channel 23 can be connected to the discharging part of the control line 13.

Permanently placed and concentrically within cylinder 20 is a hollow cylindrical guide member 24 substantially smaller in diameter than cylinder 20. On the outside of cylinder 20 is guided a hollow plunger 25 running along the inside of the cylinder 20, whose head 26 has a central opening 27. The hollow plunger 25 is supported at the rear end by springs 28 acting in the closed direction on a collar of the guide member 24. In the area of the spring chamber, the cylinder 20 has outlet openings 29 that open into the ring channel 23. An internal plunger 30 is guided along the inner wall of the guide member 24, whose head can close the central opening 27 in the head 26 of the hollow plunger 25. This inner plunger 30 is also supported by springs 31 acting in the closing direction on a collar of the guide member 24. The cylinder 20 beyond this inner plunger 30 has an outlet opening 32 connected directly to the spring chamber of the inner plunger. Opening 32 is connected through radial channels 33 to the ring channel 23 and the discharging part of the control line 13.

The entire cross section of the outlet openings 29 of the cylinder 20 in the area of the springs 28 should be smaller than the effective cross section of the outlet opening 32 on the rear end of the cylinder 20. This causes the plungers 25 and 30 to work against different displacement resistances.

At a small distance beyond the head 26 of the hollow plunger 25 and in the area of the inner cylinder chamber formed by the hollow plunger 25 and the inner plunger 30, the hollow plunger 25 has passage openings 34 for the damping medium, which correspond to outlet openings 35 in the wall of the cylinder 20. The spring strengths of the springs 28 and 31 are such that the ratio of the spring constant to the effective cross sectional area of the associated plunger is about the same.

Pressure compensation can produce particularly reliable, low-wear running of the pinions 7 surface-mounted in planetary fashion without journals in the recesses 6 of the inner part of the pump 5.

FIG. 4 shows a possibility of such pressure compensation in the form of an annular groove 36 concentric to the recess 6 leading from the suction side of the pump chamber, which opens diametrically opposite to the suction point in the recess 6.

FIGS. 5 and 6 show another embodiment, in which each pinions 7 has diametrically opposite passage bores 37 displaced axially from one another.

It is desirable to provide special teeth between the pinions 7 and the ring gear 2, in which the one gear has standard teeth and has gaps that are wider than in standard teeth, and in which the other gear has the opposite arrangements of teeth and gaps. For example, such special teeth are built as shown in FIG. 7, so that the ring gear 2 has tooth gaps 38 that occupy the space of two adjacent tooth gaps, including a standard tooth lying between them. Conversely, the pinions 7 have correspondingly large teeth 38', between which there are tooth gaps 39' whose dimensions correspond to the standard profile, and interact with the teeth 39 of the ring gear 2. Such special teeth have the advantage that the guide surfaces of the pinions 7 on the recess 6 are larger than with standard teeth. Larger forces can also be absorbed. Different ratios can also be provided between tooth and tooth gaps.

FIG. 8 shows another embodiment of the invention. According to this, it is desirable for the recess 6 in the inner part of the pump 5 to be designed so that it provides greater clearance for the pinion 7 in the tangential direction. That is, it is designed tangentially as an elongated hole 6'. In operation, the pinion 7 then settles into its operating position and is displaced to one side only when impacted by a torque and seals off the pressure side. In idling, on the other hand, it permits a large clearance, which avoids "idle rattle".

The relative velocity between the rotating pump housing 2 and 3 ring gear and face plates and the inner pump chamber 5 is the slippage necessary for the damping of the rotary vibrations. There are points in the performance characteristics of an engine where more or less severe damping is necessary. Therefore, the slippage should be controlled to the extent associated with the operating point, which ultimately is equivalent to a control of the time flow rate of the damping medium.

With high slippage, the damping medium is heated, which can be unacceptably high in an extreme situation. It is desirable in such situations for the pinions 7 positioned in planetary fashion to consist of a material whose thermal expansion is greater than that of the material from which the ring gear 2 and the pump interior 5 are made. When a certain temperature is then reached, the pinions 7 then causes a blockage and no slippage can occur any longer. Only when the torsional vibration damper has again cooled down enough to reach its operating temperature do the pinions 7 again begin to rotate.

Figure 9:
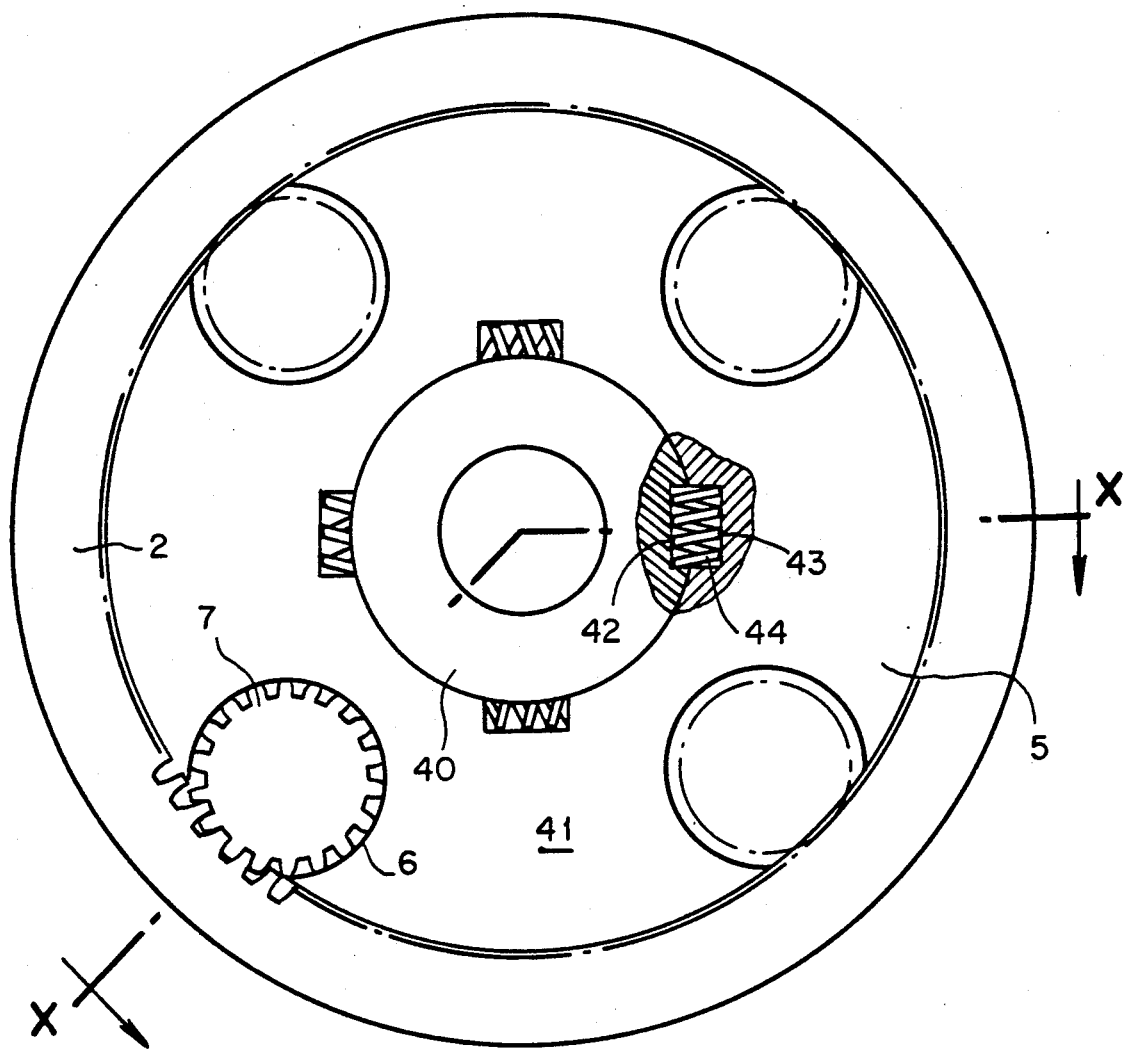
FIG. 9 shows a top view of a predamping mechanism.
Figure 10:
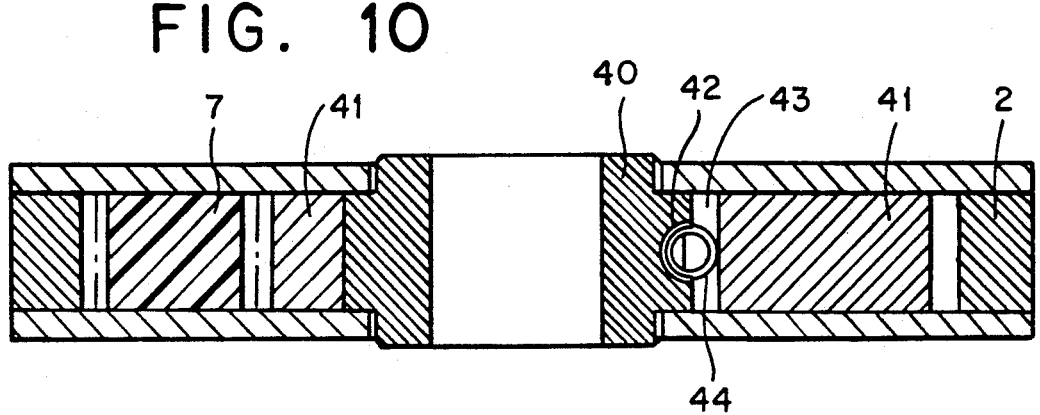
FIG. 10 shows a section along the line X—X of FIG. 9.
Figure 11:
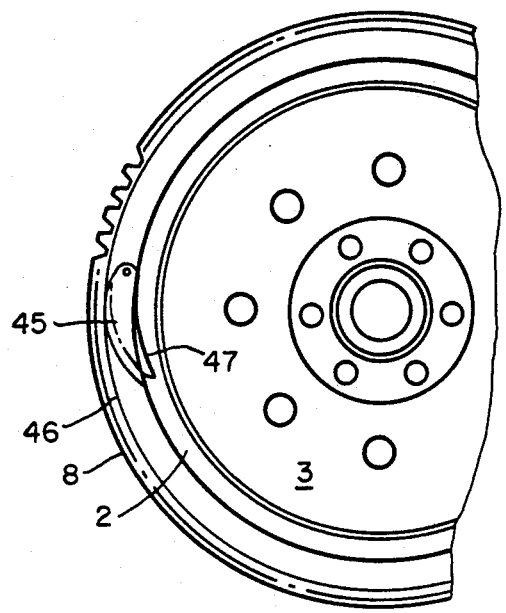
FIG. 11 shows a partial top view of a gear pump having a blocking device.

In order to produce a satisfactory damping during idling, predamping is provided. This is shown in FIGS. 9 and 10. In this embodiment, the inner pump part 5 consists of two components 40, 41 mounted to rotate concentrically around one another. They have radial recesses 42 and 43 in their bearing surfaces to positively hold tangentially located clutch springs 44. Particularly during idling or with low torque, torsional oscillations and vibrations can be intercepted by this. As soon as a certain torque is transmitted, the coupling of the components 40, 41 has a rigid action.

To prevent relative motion from occurring between the pump parts while a vehicle is stopped and in which the vehicle is equipped with a device pursuant to the invention, a clamping or parking block is provided. This embodiment is illustrated in different forms, as shown in FIGS. 11 to 20.

Figure 12:
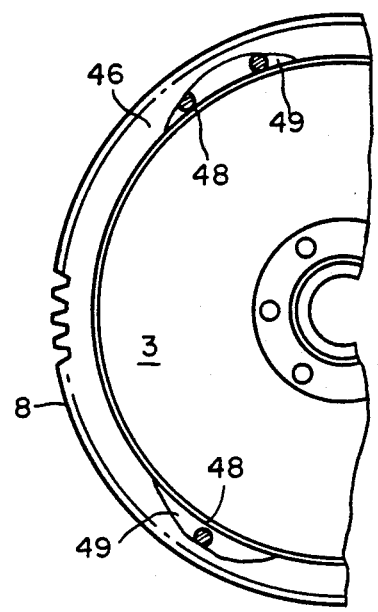
FIG. 12 shows a partial top view of a gear pump having another blocking device.

On the one hand, there is the possibility of external blocking from the outside. In this situation, a blocking latch 45 in FIG. 11 on the edge 46 in FIG. 11 of the starter gear 8 acts in each case on latch recesses 47 in the ring gear 2. As FIG. 12 shows, at least one roller 48 in a key-shaped recessed space in the edge 46 of the starter gear 8 acts in combination with the ring gear 2 as a clamping block.

Figure 13:
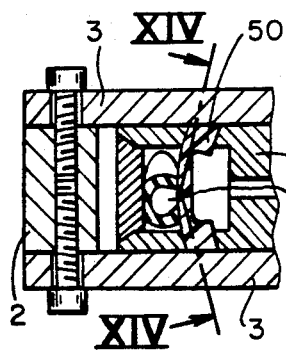
FIG. 13 shows a longitudinal section view of a blocking device for the gear pump.
Figure 14:
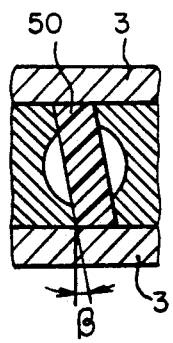
FIG. 14 shows a cross section view of the blocking device taken along line XIV—XIV of FIG. 13.
Figure 15:
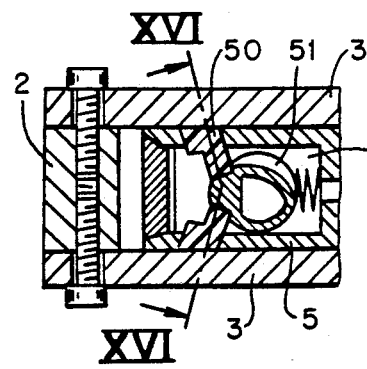
FIG. 15 shows a longitudinal section view of another blocking device for the gear pump.
Figure 16:
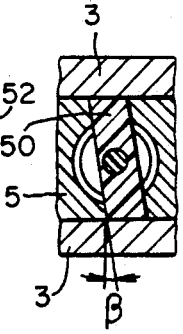
FIG. 16 shows a cross section view of the blocking device taken along line XVI—XVI of FIG. 15.
Figure 18:
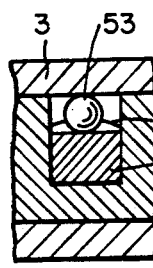
FIG. 18 shows a cross section view of the blocking device taken along line XVIII—XVIII of FIG. 17.
Figure 19:
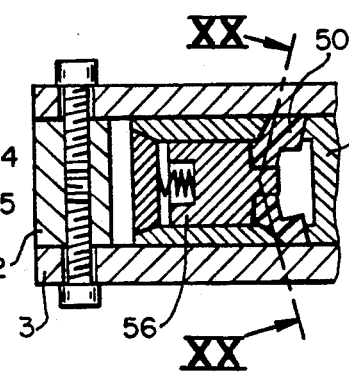
FIG. 19 shows a longitudinal section view of another blocking device for the gear pumps.
Figure 20:
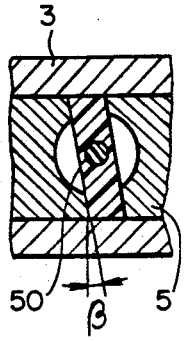
FIG. 20 shows a cross section view of the blocking device taken along line XX—XX of FIG. 19.

Examples of an internal clamping or parking block are shown in FIGS. 13 to 20. FIGS. 13, 14; 15, 16; and 19, 20 show a flexible, curved or bent blocking clamping member 50 within the inner pump part 5, the ends of which rest against the insides of the face plates 3. It is desirable for the blocking member 50, as shown in FIGS. 14, 16, and 20, to be placed diagonally from the vertical at an angle $\beta$ which ranges between 5 degrees to 25 degrees. Acting on the blocking member 50 is a flexible actuator 51, which rests radially on the outside or inside of the blocking member 50 as a compressible, floating hollow object in FIG. 13, or as a rigid floating hollow object in FIG. 15, or as a spring-supported piston 56 in FIG. 19. Actuator 51 can press member 50 in toggle lever manner against the surfaces of the face plates 3. In FIG. 15, the blocking and actuating members 50 and 51 are located in a chamber 52 that is more or less filled with oil. When the engine is stopped, the actuators 51 are fully effective. When the engine starts, the damping medium accumulates on the outside because of the centrifugal force and relieves the actuator 51.

FIGS. 17, 18, 19 and 20 show examples of a mechanical method.

Figure 17:
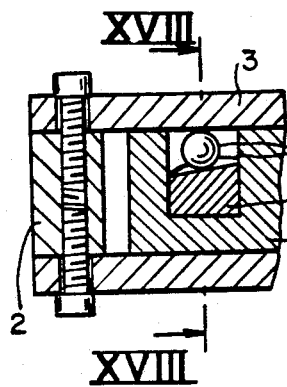
FIG. 17 shows a longitudinal section view of another blocking device for the gear pump.

The parking block of FIGS. 17 and 18 uses rollers such as ball bearings as the blocking member 53, that are located in a wedge-shaped expanding space 54 of a recess 55 in the inner pump part 5. They occupy a clamping position when idling, and release the blocking when the engine starts because of the centrifugal force.

The parking block of FIGS. 19 and 20 uses a spring-mounted actuator 56, which during engine idling presses against the blocking member 50 in the clamping direction, and moves toward the outside radially when the engine starts and releases the clamping block.

In operation, after the drive engine starts, the parking block is released. The inner pump part 5 with its ring components 40 and 41 occupies its fixed operating position, and the gear pump delivers liquid damping medium; low-viscosity oil can also be used in this case in the closed delivery line 10.

Any volume shocks because of torsional vibrations are first absorbed in a known way by the flexible storage chamber 14. Further torsional vibrations act in a known way through the throttle 15 on the plunger valve 16 acting as a centrifugal regulator.

The damping medium also acts on the control valve 17. Slow pressure changes in this case act on both of the plungers 25 and 30 together, which are moved against the springs 28 and 31 and accept damping medium into the inner cylinder chamber. If dynamic pressure changes occur such as shocks, i.e., transitorily, then the more readily responding inner plunger 30 is lifted away from the more sluggish hollow plunger 25 and permits the damping medium to flow out of the outlet openings 33. From the two valves 16, 17 the damping medium arrives at the circulation of the next pair of gears of the gear pump.

While several embodiments of the present invention have been shown and described, it is to be understood that many changes and modifications may be made thereunto without departing from the spirit and scope of the invention as defined in the appended claims.

What is claimed is:

1. A device for changing the flow rate of a liquid damping medium connected between a drive shaft and a power takeoff shaft of an engine comprising:
   a torsional vibration damper having a rotating cylindrical damper housing, connected to said drive shaft and said power takeoff shaft;
   pinions planetary mounted and engaged with a central gear seated on a shaft;
   a gear pump for closed circulation of the damping medium, having a storage chamber with flexibly changeable volume;
   a speed-controlled plunger valve being provided in a feed pipe having a cross section for the damping medium, having a piston for changing the cross section of the feed pipe as a throttle regulator by axial motion of said piston;
   said pinions of the gear pump arranged in planetary fashion, and are devoid of axle journals;
   said gear pump having an interior and having axial faceplates and recesses in the pump interior; and
   said pinions being surface mounted between said axial faceplates of the gear pump in said recesses in the pump interior.

2. A device according to claim 1, wherein the central gear is a ring gear with internal teeth.

3. A device according to claim 1, wherein the pinions are in a planetary arrangement and have diametrically opposite pressure compensation bores displaced axially from one another and not intersecting one another.

4. A device according to claim 1, wherein the gear pump interior has a recess for the pinion and has a pressure compensating channel surrounding the recess for the pinion with clearance, said gear pump interior opening diametrically opposite a point of engagement of a pair of gears within the recess holding the pinion.

5. A device according to claim 4, wherein the recesses for the pinions have a tangential direction and are arranged in planetary fashion and are widened in the tangential direction into elongated holes.

6. A device according to claim 5, wherein the pinions arranged in planetary fashion are comprised by one material having a thermal expansion greater than that of a second material of the ring gear and of the pump interior.

7. A device according to claim 1, wherein the pinions arranged in planetary fashion and a central gear have special gear teeth, so that if one gear has normal gear teeth and has gear tooth gaps that are wider than with normal gear teeth, then another gear has gear tooth gaps for normal gear teeth and has gear teeth that are correspondingly wider than the gear tooth gaps for normal teeth.

8. A device according to claim 1,
wherein the damping medium is at full pressure in a feed pipe; and
further comprising a control valve responding to dynamic pressure changes and exposed to the full pressure of the damping medium in the feed pipe beyond the storage chamber and the speed-controlled plunger valve parallel to it.

9. A device according to claim 8, wherein the control valve has an inner cylinder having a bottom within a cylindrical outer housing with a larger diameter and with a bottom;
a control line having a discharging part, and a pressure side;
an annular channel formed between said outer housing and said inner cylinder in an area beyond the bottom of the larger diameter of the outer housing that is connected to the discharging part of the control line, said annular channel connectable to the pressure side of the control line through outlet openings in a wall of the outer housing and a central bore in the bottom of said inner cylinder;
a hollow plunger having a head and having a closed direction provided with a central opening in the head of the plunger and passage openings in the wall of the plunger is supported on the inner cylinder by first springs acting in the closed direction;
said cylinder having a first outlet opening having a cross section and adjacent to the first springs opening into the annular channel and a central outlet opening at its rear end and having a cross section, which is connected to the annular channel, with a ratio of the cross section of this central outlet opening to the cross section of the first outlet opening being greater than one in a first spring area;
a cylindrical guide member extending into the hollow plunger and bounding its spring area;
an inner plunger having a closed direction and supported on second springs acting in the closed direction, said inner plunger having a head which can close the central opening in the head of the hollow plunger and whose spring area is connected directly to the central outlet opening on the rear end of the inner cylinder; and
whereby the spring strength ratio of the spring constant to the effective cross section of the hollow plunger is the same as the spring strength ratio for the inner plunger.

10. A device according to claim 1, further comprising at least one positive interlocked parking block between the drive shaft and the power takeoff shaft of the gear pump.

11. A device according to claim 10, wherein the gear pump has a part solidly connected to the drive shaft and power takeoff shaft, holding the pinions arranged in planetary fashion which comprises two components mounted to rotate on one another, and tangential, positively mounted springs for flexibly coupling said two components to one another.

12. A device according to claim 1, wherein the shaft comprises a power takeoff shaft.

13. A device according to claim 1, wherein the shaft comprises a drive shaft.

* * * * *